(12) United States Patent
Jakobi

(10) Patent No.: US 6,196,483 B1
(45) Date of Patent: Mar. 6, 2001

(54) CHAFT CUTTER FOR COMMINUTING HAULM BEHIND THE GRAIN-SEPARATOR DEVICES OF A COMBINE HARVESTER

(75) Inventor: Wilhelm Jakobi, Ertingen (DE)

(73) Assignee: Biso B.V., Roosendaal (NL)

( * ) Notice: Subject to any disclaimer, the term of this patent is extended or adjusted under 35 U.S.C. 154(b) by 0 days.

(21) Appl. No.: 09/254,491
(22) PCT Filed: Sep. 10, 1996
(86) PCT No.: PCT/EP96/03969
§ 371 Date: Aug. 2, 1999
§ 102(e) Date: Aug. 2, 1999
(87) PCT Pub. No.: WO98/10634
PCT Pub. Date: Mar. 19, 1998
(51) Int. Cl.[7] .................................................. B02C 19/12
(52) U.S. Cl. .................................. 241/101.763; 241/243; 241/605
(58) Field of Search .................................. 241/243, 222, 241/221, 55, 190, 194, 605, 101.763

(56) References Cited

U.S. PATENT DOCUMENTS

| 3,103,241 | 9/1963 | Weigl . |
| 4,532,941 | 8/1985 | Gauthier . |
| 4,637,406 | 1/1987 | Guinn et al. . |

FOREIGN PATENT DOCUMENTS

| 0166116 | 1/1986 | (EP) . |
| 0538599 | 4/1993 | (EP) . |

Primary Examiner—Mark Rosenbaum
(74) Attorney, Agent, or Firm—Dilworth & Barrese

(57) ABSTRACT

The subject matter of the invention is a straw-cutting machine which is disposed behind the grain separating devices of a combine harvester and whose separating devices cut up the stalks falling down from the straw walkers into short pieces. In this process, due to an innovative, special disposition of the generally conventional deflector which, under the straw walkers, deflects the stalks from falling down from these to the cutter tray at the inlet into the cutter, receiving the stalks by the cutting drum is made more secure and, on the other hand, due to an innovative, special design of the distribution hood following the cutter, ejection and distribution of the chopped up stalks over the field soil is essentially improved over existing designs.

12 Claims, 2 Drawing Sheets

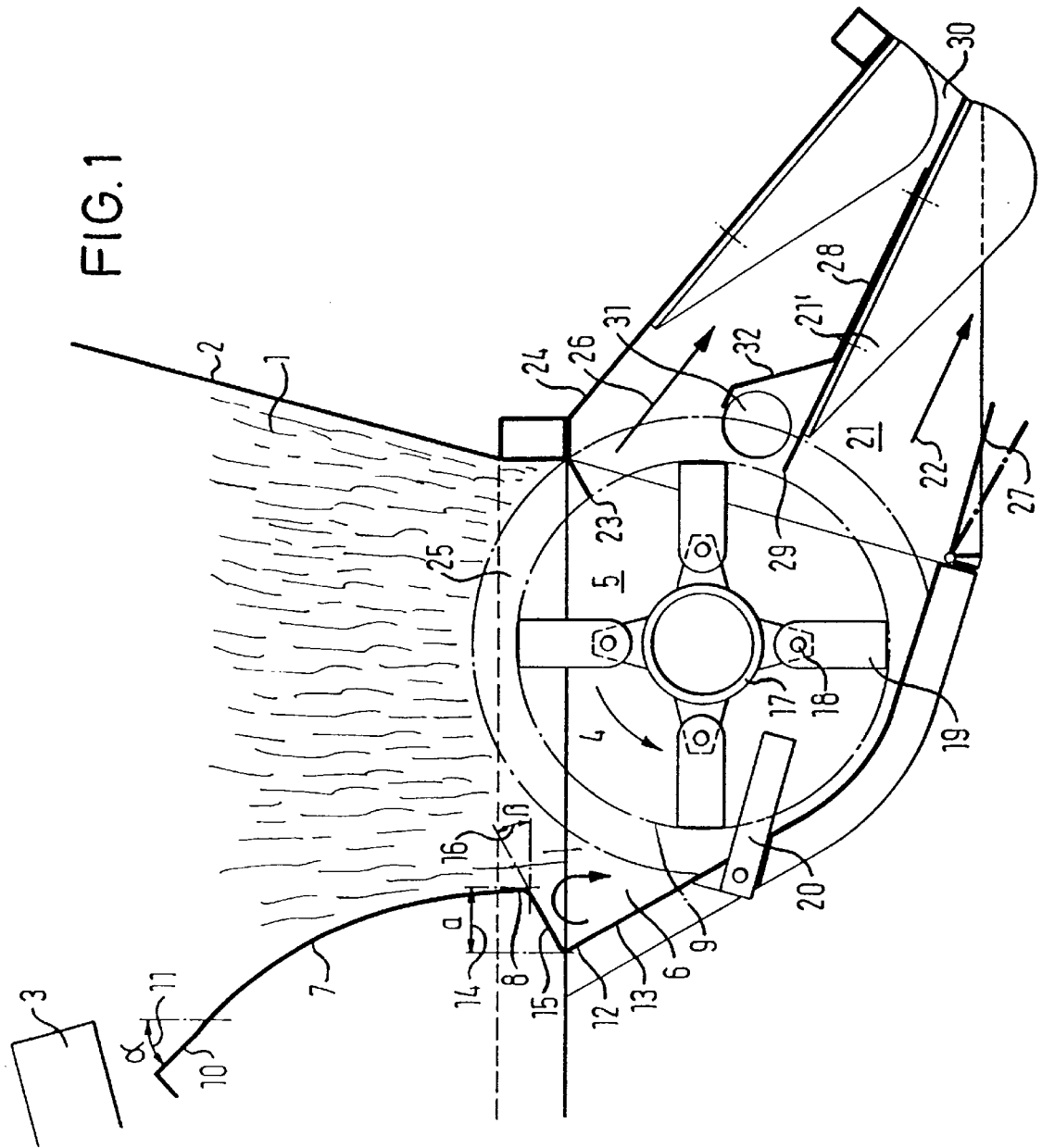

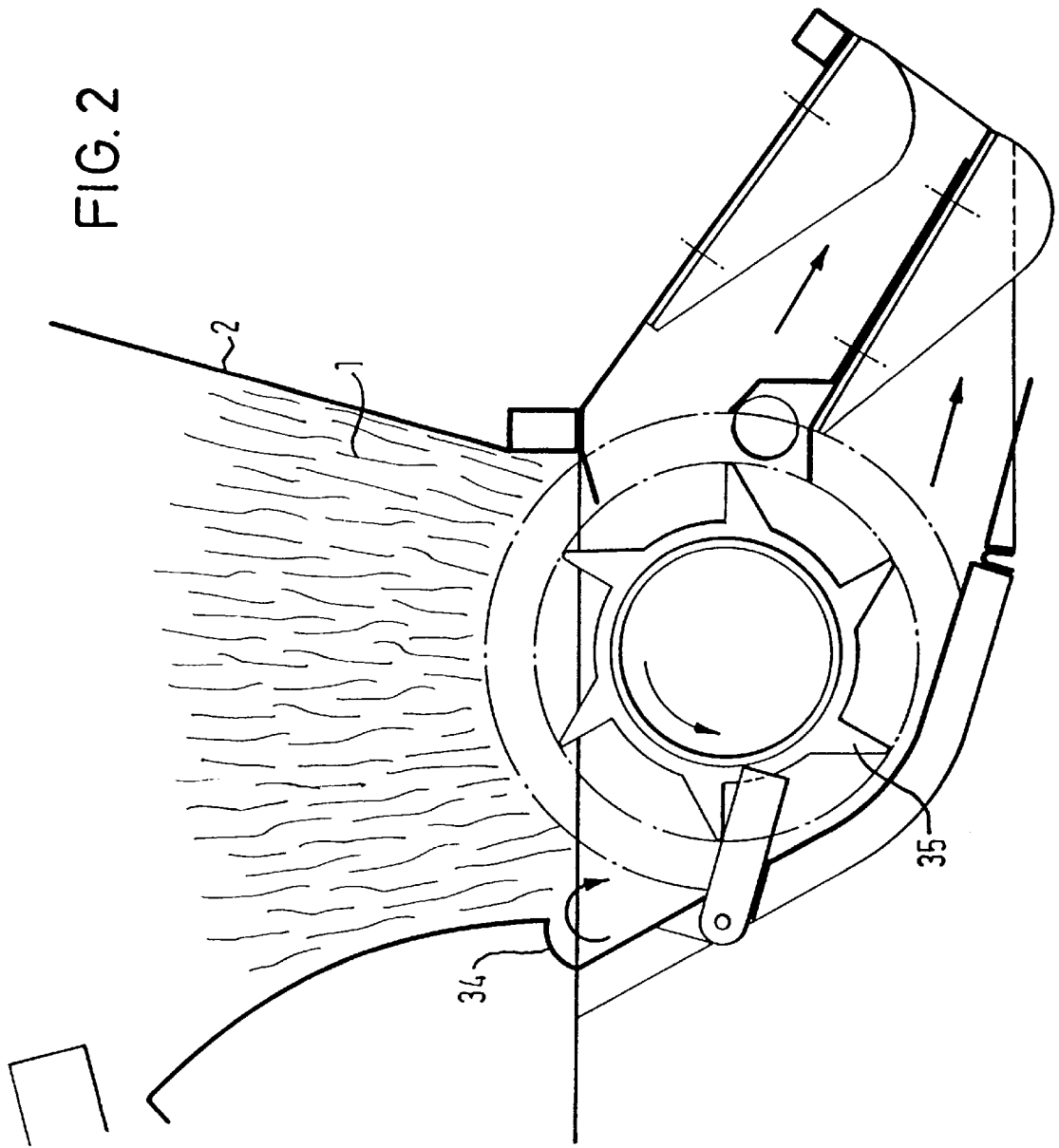

CHAFT CUTTER FOR COMMINUTING HAULM BEHIND THE GRAIN-SEPARATOR DEVICES OF A COMBINE HARVESTER

BACKGROUND OF THE INVENTION

The subject matter of the invention is a straw-cutting machine which is positioned behind the grain separating devices of a combine harvester and whose separating organs chop the stalks falling from the straw walkers into short pieces.

SUMMARY OF THE INVENTION

The object of the present invention can be found in that, on the one hand, thanks to an innovative, special disposition of the generally conventional deflector, which—below the straw walkers—guides the stalks falling down from these to the cutting tray at the inlet into the cutter and, on the other hand, thanks to an innovative, special design of the distributor hood located behind the cutter, the receiving of the stalks by the chopping drum is more secure and the ejection and distribution of the chopped stalks onto the field soil is essentially improved over existing designs.

A secure, uninterrupted receiving of the straw by the chopping drum prevents interruptions to and jams in the straw outlet hood of the combine harvester due to the stalks falling from the straw walkers and has a positive effect on the chopping process.

A uniform distribution of the chopped stalks over the whole cutting width through the distribution hood is desirable for an uninterrupted working into the field soil and the best possible rotting.

Due to the relatively high speed of the chopping drum, there is formed around the chopping drum of a combine harvester straw-cutting machine a mantle-like rotating ring of air of which, in cutters of current design, a substantial portion flows into the straw outlet hood and hinders the receiving of the stalks falling from the straw walkers by the cutting blades (19) or tangs (35).

This air which has flowed into the straw hood is then not available for the ejection of the chopped stalks.

In accordance with the invention, this hindrance is avoided by the deflector (7) at the inlet into the chopping housing being formed in an arched design between the end of the straw walker and the inlet into the cutter, with the upper part of the deflector possessing a certain angle to the perpendicular, while the lower part ends approximately perpendicularly. Furthermore, the inlet of the cutting tray is inset forwards from the center of the cutter over the lower part of the deflector.

The lower end of the deflector and the beginning of the cutting tray are connected to each other by an approximately horizontal transverse tray (15, 34). Advantageously, this transverse tray is designed with an upwards arch form. Thanks to this combination of deflector end to cutting tray inlet, the ring of air around the outside effective diameter of the cutting drum is cut off and air flows into the straw ejector hood which hinders the receiving of the stalks to be chopped are prevented. Rather, the cut off air is deflected into the area of rotation of the chopping drum, by means of which at the inlet into the chopping box a slight suction effect is created on the stalks to be chopped in the direction of rotation of the chopping drum.

At the transition of the chopping box to the distribution hood, a similarly negative effect of the ring of air exists in cutters of current construction.

The height of the inlet to the distribution hood on cutters of current construction is a maximum of ⅓ of the drum diameter.

Following on this is a closed part up to the connection of the cutter to the straw ejector hood of the combine harvester. In this part, a ring of air builds up which flows into the straw ejector hood and which pushes upwards the stalks falling from the straw walkers.

In accordance with the invention, the transition from the cutter housing to the straw ejector hood is designed so that the free exit height is around ⅔ of the drum diameter, with the upper cover of the distribution hood possessing at the front end transversely over the width a tray (23) which is aligned approximately perpendicularly to the central axis of the cutting drum and having a distance to the outer drum circumference of around 10 mm. In this way, the ring of air is cut off and deflected into the distribution hood. To avoid eddies of air in the distribution hood, roughly at the center of the height of the distribution hood, a transverse metal partition is installed which divides the distribution hood into two chambers and whose front edge also extends perpendicularly to the central axis of the cutting drum up to about 10 mm away from the outer circumference of the cutting drum, with as a result the ring of air also being cut off here and the air being deflected into the distribution box.

Directly above the metal partition, at the transition from the cutter housing to the distribution hood, apertures are disposed on both side walls of the distribution hood through which the air can flow in. A transverse intermediate plate (28) separates the air flowing in from the area above the metal partition.

Thanks to the actions at the cutter inlet and the cutter outlet described above, at these points air flowing off the air of ring pressing into the straw ejector hood is prevented.

The transverse distribution of the chopped stalks flowing out of the distribution hood is performed in the known manner by means of arched distribution plates rotatable through a roughly perpendicular axis.

The vertical distribution of the stalks flowing out is performed by an adjustment to the metal partition and the floor plate around horizontal axes in the area of the connection of the distribution hood to the cutter housing.

BRIEF DESCRIPTION OF THE DRAWINGS

Further details of the invention are disclosed in FIG. 1 and FIG. 2 with the corresponding description and in dependant claims.

The design of the straw-cutting machine in accordance with the invention is disclosed in FIG. 1 and FIG. 2 with the associated descriptions.

In these:

FIG. 1 shows a straw-cutting machine in which the cutting blades are affixed in a freely movable manner to the drum jacket and work against rigid counter-blades affixed to the cutting tray;

FIG. 2 shows a straw-cutting machine in which rigid tangs are affixed to the drum jacket which work together with cutting blades affixed to the cutting tray.

DESCRIPTION OF THE PREFERRED EMBODIMENTS

With reference to FIG. 1:

The stalks (1) to be chopped fall inside the straw ejector hood (2) from the ends of the straw walkers (3) onto the cutting drum (5) rotating in the direction of the arrow (4).

Here, between the ends of the straw walkers (3) and the inlet gap (6), the stalks falling down from the straw walkers are restricted in a forward aspect by an arch-shaped deflector (7). The lower end (8) of the deflector (7) runs roughly perpendicularly towards the outer region of the outer effective diameter (9) of the drum.

The upper end (10) of the deflector below the straw walkers can be inclined up to an angle a (11)=45 degrees to the perpendicular.

The upper end (12) of the cutter tray (13) is transposed over the lower edge (8) of the deflector by a distance a (14) by at least 20 mm, preferably 30 mm to the front in the direction shown.

The lower end (8) of the deflector is connected to the upper end (12) of the cutter tray by a transverse plate (15) which is designed in accordance with FIG. 1 as a straight sheet which is installed in a position from the horizontal to an angle of β (16)=max. 45 degrees.

On the cutting drum (5), any number of cutting blades (19) are affixed freely movable around a point of rotation (18) on the jacket plate (17).

These receive the stalks falling down and chop them up while they pass through the counter-blades (20) affixed to the cutter tray (13).

The chopped up stalks are carried out of the cutter housing through the distribution hood (21, 21') in the direction of the arrow (22).

Following on from the cutter housing, from the outlet at the bottom up to the connection to the straw ejector hood (2), the distribution hood is open at the top, at least in a region which corresponds to ⅔ of the outer effective diameter (9) of the drum. The front edge (23) of the top cover plate (24) is designed so that it extends roughly perpendicularly to the drum center to around a distance of 10 mm to the outer effective diameter (9) of the cutting drum (5).

In this way, a ring of air (25) forming around the cutting drum is cut off and deflected in the direction of the arrow (26).

To optimize the flow relationships in the distribution hood, an intermediate plate (28) is fixed roughly in the center between the upper cover plate (24) and the bottom outlet plate (27) transversely through the distribution hood; said intermediate plate (28) extends with its front edge (29) to around 5 mm from the outer effective diameter of the cutting drum and thus also cuts off the ring of air (25) here and deflects the air in the direction of the arrow (22).

To ensure that a ring of air being built up does not reach the air from the outlet (30) of the distribution hood and so interrupts the air flowing out in the direction of the arrow (26), in the side walls of the distribution hood apertures (31) are made which are covered with respect to the inside space (20') by a cover plate (32) running transversely through the distribution box.

With reference to FIG. 2:

FIG. 2 corresponds exactly to FIG. 1 with the exception of the two modifications given below. Instead of the transverse plate (15), a transverse plate (34) arched upwards is used. The freely movable cutting blades (19) were replaced by rigid tangs (35).

What is claimed is:

1. In a straw-cutting machine for the chopping up of stalks behind grain separating devices of a combine harvester, a straw deflector (7) structured and arranged to be situated between a straw walker end and a cutting housing and having an arched shape such that an upper end of the deflector (7) is inclined below straw walkers at an angle larger than 25 degrees to perpendicular, while a lower end of the deflector (7) at an inlet to the cutter housing extends approximately perpendicularly, with a cutter tray (13) being transposed over the lower end of the straw deflector (7) by a distance greater than 30 mm.

2. A straw-cutting machine in accordance with claim 1, wherein between the lower end of the straw deflector (7) and the upper end (12) of the cutter tray (13) a connecting plate (15) is fixed whose inclination is less than 60 degrees to horizontal.

3. A straw-cutting machine in accordance with claim 2, wherein the angle of inclination of the connecting plate (15) is less than 45° to the horizontal.

4. A straw-cutting machine in accordance with claim 1, wherein between the lower end of the straw deflector (7) and the upper end of the cutter tray (12) a connecting plate (34) is fixed which is arched upwards.

5. A straw-cutting machine in accordance with claim 1, wherein height of a free aperture at transition from the cutter housing to a distribution hood coupled to the cutter housing is equal to at least ⅔ of outer effective diameter of a cutting drum in the cutter housing.

6. A straw-cutting machine in accordance with claim 5, wherein an upper cover plate of the distribution hood extends to at least 10 mm away from the outer effective diameter of the cutting drum and an end of the cover plate is aligned roughly perpendicularly to an axis center of the cutting drum.

7. A straw-cutting machine in accordance with claim 1, comprising a distribution hood (21) downstream of the cutter housing and being divided into two chambers vertically by an intermediate plate (28), with a front end (29) of the intermediate plate (28) extending at least to a distance of 10 mm to an outer effective diameter of a cutting drum in the cutter housing and the end (29) of the intermediate plate (28) being aligned roughly perpendicularly to an axis center of the cutting drum, with the intermediate plate (28) being swivellable around an axis roughly parallel to the axis center of the cutting drum.

8. A straw-cutting machine in accordance with claim 7, structured and arranged to cut off a ring of air (25) forming around the cutting drum and deflecting this air (25) downstream into the distribution hood (21).

9. A straw-cutting machine in accordance with claim 7, wherein directly above the intermediate plate in side walls of the distribution hood, apertures (31) are disposed which are covered off from interior space of the chamber above the intermediate plate by a metal partition (32) disposed transversely through the distribution hood.

10. A straw-cutting machine in accordance with claim 1, wherein following on from lower transition from the cutter housing to a distribution hood, a floor plate is disposed which is structured and arranged to be rotated vertically by an axis of rotation in a region of the transition.

11. A straw-cutting machine in accordance with claim 1, structured and arranged to cut off air around an outside effective diameter of a cutting drum disposed in the cutter housing and reflecting this air into an area of rotation of the cutting drum to create a slight suction effect on stalks to be chopped in direction of rotation of the cutting drum.

12. A straw cutting machine in accordance with claim 1, wherein the cutter tray (13) comprises counter-blades (20) affixed thereto.

* * * * *